Feb. 13, 1923.
G. A. LYTLE.
WHEEL.
FILED MAR. 14, 1921.
1,445,522.
2 SHEETS—SHEET 2.
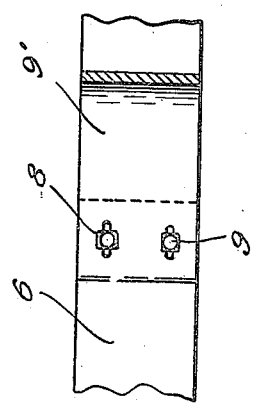
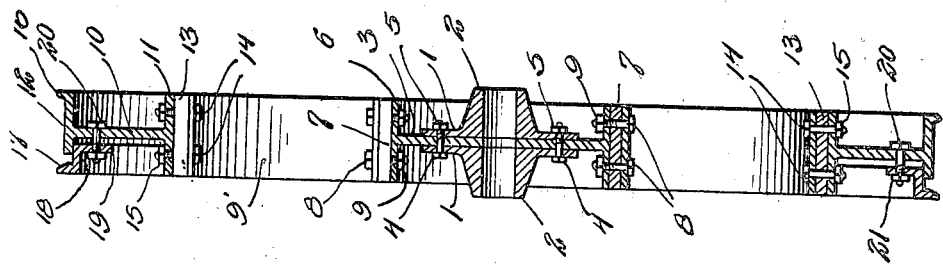
George A. Lytle.
INVENTOR
BY Victor J. Evans.
ATTORNEY
WITNESSES:

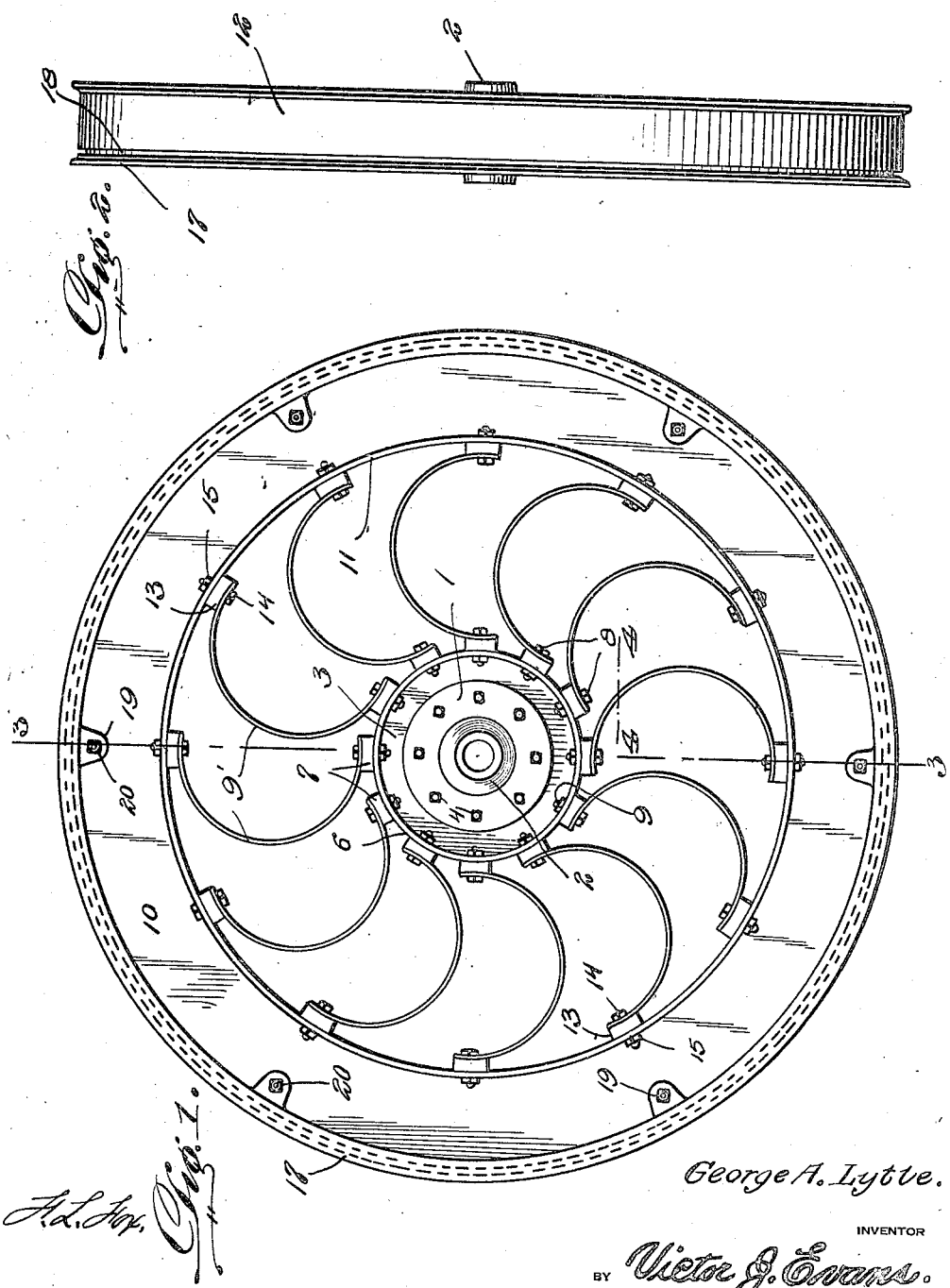

Patented Feb. 13, 1923.

1,445,522

UNITED STATES PATENT OFFICE.

GEORGE A. LYTLE, OF SACRAMENTO, CALIFORNIA.

WHEEL.

Application filed March 14, 1921. Serial No. 452,145.

*To all whom it may concern:*

Be it known that I, GEORGE A. LYTLE, a citizen of the United States, residing at Sacramento, in the county of Sacramento and State of California, have invented new and useful Improvements in Wheels, of which the following is a specification.

My present invention has reference to improvements in vehicle wheels.

My object is the production of a strong and efficient wheel in which spring spokes are employed, whereby the wheel will have substantially all of the resiliency of a pneumatic tired wheel without being subjected to the danger of puncture to the said tire, or the necessity of inflating the same.

A further object is to construct a spring wheel which is of a simple, strong and efficient nature, and wherein arched spring spokes are employed between the hub and felly of the wheel, the same having their ends cushioned and being so constructed and arranged that the shock delivered to one of the said spokes will be absorbed by the remainder of the spokes.

A further object is the production of a spring wheel in which comparatively wide and comparatively short arched spring spokes are employed, the same being connected between the hub and the felly in a novel manner which, however, permits of the removal of any one of the spokes without interfering with the remaining spokes, the weight and comparatively short lengths of the springs permitting of the employment of comparatively heavy yet sufficiently resilient material to render the device strong so that heavy loads can be carried by the vehicle without inflicting undue strain on the spokes.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is a side elevation of a vehicle wheel constructed in accordance with this invention.

Figure 2 is an edge view thereof.

Figure 3 is a sectional view on the line 3—3 of Figure 2.

Figure 4 is a sectional view on the line 4—4 of Figure 1.

The hub of my improved wheel comprises outer disks 1—1 that have central openings which are surrounded with outwardly extending bosses 2—2. Between the disk plates 1, and having an opening aligning with the bore of the bosses 2 there is a flat peripherally rounded plate 3. Passing through the disk plate 1 and through the member 3 are removable elements in the nature of bolts 4 which are engaged by nuts 5. Thus it will be noted that the central portion of the hub comprises three separable members. A suitable boxing may be arranged in the bore of the hub for the vehicle axle, if desired.

The circular plate 3 has its periphery formed with a laterally extending annular flange 6 which is of a width slightly less than the bosses 2 of the hub. At predetermined equi-distantly spaced intervals on the outer periphery of the flange 6 there are secured transverse cushion blocks 7. The securing means, constituting bolts 8 engaged by nuts 9, also serve for connecting the inner ends of the arched spring spokes 9' to the cushion blocks and to the hubs. The spokes 9' are of a width equalling that of the flange 6 and that of the blocks 7, so that the said spokes are comparatively wide. Also the spokes are comparatively short, and therefore the same may be constructed of some heavy metal of a strength amply sufficient to withstand the strain to which the wheel is subjected, the said metal, however, embodying sufficient resiliency to permit of the free yielding of the spokes. To compensate for the unequal yielding of the spokes, the openings through which the bolts 8 pass through the said spokes are elongated and similar slots might be placed in the outer ends of the spokes 9.

The felly of the wheel is in the nature of a flat ring member 10 that has both its inner and outer edges provided with lateral flanges 11 and 12 respectively. Thus the felly is of a cross sectional I construction. The inner flange 11 is of a width equalling that of the spokes, and has secured on its inner face, at equi-distantly spaced intervals, transversely arranged cushion blocks 13. The securing means for the blocks are in the nature of bolts 14 which are engaged by nuts 15, and this means also serves to secure the outer ends of the spokes on the respective blocks.

The outer flange 12 of the felly comprises the tire carrying rim of the device, and is of a less width than that of the inner flange 11. The rim 12, however, is extended from one side of the flat ring 10 a distance equalling that of the flange 11, and the upper corner of the referred to extended portion of the rim has an integrally formed annular bead or flange 16 to engage with one of the edges of a tread (not shown). The inner and shorter portion of the tire carrying rim, is indicated for distinction by the numeral 17, and is designed to form a part of the flanged ring 18 and is adapted to engage with the opposite inner edge of the tread. The ring 18 is provided, preferably at equi-distant points with inwardly extending radially directed lugs 19. Through each of the lugs there passes a bolt 20 that also passes through the ring 10, the outer end of the said bolts having screwed thereon nuts 21, and whereby the tread engaging ring 18 is clamped against the tread carrying rim 12 of the improvement.

It is believed that the foregoing description, when taken in connection with the drawings will amply set forth the construction and advantages of the improvement to those skilled in the art to which such inventions relate without further detailed description.

Having described the invention, I claim:—

1. In a spring wheel construction, a hub having its outer periphery formed with an annular flange of a width slightly less than that of the hub proper, equi-distantly spaced cushion blocks disposed transversely on the outer periphery of the flange, a felly surrounding the hub and having an inner flange eqaulling the width of that of the flange of the hub, spaced cushion blocks on the inner periphery of the said flange, disposed opposite the respective blocks on the flange of the hub, arched springs having their ends loosely connected to the respective opposed blocks, and the connecting means between the hubs and blocks securing the said blocks to the respective flanges, and said spokes being of a width equalling that of the flanges.

2. The combination in a wheel construction, including a hub having a central disk-like plate having its outer periphery provided with a lateral continuous flange, disk members on the sides of the plate having central bosses extending outwardly therefrom and said bosses having bores which align with the central opening in the disk-like plate, removable means securing the hub sections, of a plurality of equi-distantly spaced transversely arranged cushion blocks on the flange of the hub and of a width equalling that of the flange, arched spring spokes having their inner ends adjustably secured to the blocks, and said securing means holding the blocks on the flange, a felly surrounding the hub and spokes, and including a flat ring member that has both its inner and its outer ends provided with laterally extending flanges, the inner flange being of a width corresponding with that of the hub flange, cushion blocks on the inner periphery of the last mentioned flange disposed opposite the blocks on the hub flange and receiving thereon the outer ends of the respective spring spokes, means loosely securing the spokes to the blocks and locking the blocks on the inner flange of the felly.

In testimony whereof I affix my signature.

GEORGE A. LYTLE.